United States Patent Office 2,868,758
Patented Jan. 13, 1959

2,868,758
METHOD OF IMPROVING SOIL

Edgar B. Baker, Richmond, Calif., assignor to Stauffer Chemical Company, a corporation of Delaware No Drawing. Application December 2, 1953
Serial No. 395,849

3 Claims. (Cl. 260—41)

This invention relates to a soil conditioning composition and process.

It has long been appreciated that the physical structure or tilth of soil is highly important in the results which are obtained in agriculture. Although soils may contain all of the necessary chemical agents necessary for good plant growth, soil is not satisfactory for use unless it is in the correct physical condition.

Many agents have been proposed for improving the physical condition of soil, particularly the high molecular weight water-soluble polyelectrolytes. Such agents are relatively effective in one phase only of soil stabilization. Such agents cause an agglomeration of the minute soil particles, forming small aggregates which allow ready penetration of water and air to the soils and which make the soils easier to work. On the other hand, such soil stabilizing agents offer a distinct disadvantage inasmuch as soils stabilized in this manner tend to form clods and the agents do not aid in the breaking down of such large clods into easily worked smaller aggregates. Further, such agents must be carefully managed to be effective, i. e., soil must be properly worked and the compound distributed evenly thereon.

According to the process of the present invention, soil improving agents are provided which have two seemingly mutually contradictory properties: the agents tend to agglomerate very fine soil particles to convert the soil into a series of particles which are easy to work and which have good water and air penetration. On the other hand, with the agents of the present invention, any clods which are formed are extremely soft, so that the clods can be readily broken up or will disintegrate merely upon standing. Further, the agents of the present invention effect their beneficial result when merely sprinkled on the surface, although they may be worked into the soil if desired.

In addition, the compositions of the present invention have been found to work well with various soil types, in contrast with the agents of the prior art, which are truly effective with only certain soil types. Thus, the present compositions are effective in acid, basic and neutral soils.

It has been found that when the water-soluble polyelectrolytes, such as those set forth in Patent 2,625,529, as well as a number of other substances hereinafter defined, are combined with certain inorganic salts, the beneficial results above enumerated are achieved. The inorganic salts which have been found beneficial are salts of iron and aluminum combined with inorganic acids. The sulfuric acid salts are preferred, although other salts such as nitrates and chlorides may be used. Double salts may also be used, such as ferric ammonium sulfate, ferric potassium or sodium sulfate, aluminum ammonium sulfate, and aluminum potassium or sodium sulfate. Of these substances, it is preferred to use ferric sulfate, as this substance is relatively inexpensive, and gives uniformly good results.

The ferric sulfate, or other inorganic salt, is added in suitable proportions to an organic soil stabilizing substance to make the composition of the present invention. By organic soil stabilizing substances, there are included the compounds such as those set forth in Patent 2,625,529 and particularly modified vinyl acetate-maleic acid copolymers having a molecular weight of at least 5,000, carboxymethylcellulose, lignin byproducts such as ammonium-lignin-sulfate, and extractives from ground tree bark.

In general, it is preferred to use a relatively large proportion of ferric-sulfate and amounts as high as 95%, based on the soil stabilizer composition, may be used. On the other hand, even small amounts are of some effectiveness and as little as 10% of the ferric sulfate may be used.

The soil stabilizers of the present invention may be applied in various manners, but preferably are spread over the surface of the ground and then harrowed or disced into the upper few inches of the soil. However, if rapid results are not required, the compositions of the present invention are very effective even if merely spread on the surface of the soil. It is preferred to use about 10 pounds per 100 square feet of the soil improving agent, although amounts as small as 5 pounds per 100 square feet are beneficial on many types of soil, and under other conditions, it may be desirable to apply at a rate as high as 25 pounds per 100 square feet.

In order to show the effectiveness of the composition of the present invention, a number of tests were made. Various recognized soil types were used in conducting the tests, as follows:

A. Hugo clay loam
B. Sorrento loam
C. Pleasanton clay loam
D. Pescadero clay
E. Botella clay
F. Dublin clay
G. Alviso clay For convenience, these soil types are referred to hereinafter by the above letter designations. The type A soil is acid, the type G basic, and the balance are neutral. In each of these tests, the compound under test was applied to the soil at the rate of 10 pounds per 100 sq. ft. of surface area, when treated to a depth of 3 inches of soil. The agent was mixed into the soil, watered and allowed to stand for seven days.

Evaluation of the results on various soils were expressed in terms of surface cracking, hardness, penetration, percent aggregation, and clod disintegration. The surface cracking and hardness measurements were based on judgment and experience of the person doing the rating and the ratings given in Table VI were used.

In order to measure the penetration of the soil, a steel rod ⅛" in diameter and 10" long was fitted into a spring balance that would record 0 to 25 pounds pressure. The steel rod was ground to a tapering point, the rod was pressed into the soil to a three-inch depth and the scale reading was recorded. At least five measurements were made on each sample and the average of the readings is set forth in the table.

Aggregation was determined by a method using a Bouyoucos hydrometer. A 50 gram sample of unground and unscreened soil was slaked for 10 minutes in 50 cc. of distilled water. After slaking, the soil and water were transferred to a 1,000 cc. graduated cylinder. The graduate was filled with distilled water to 1,000 cc. with the hydrometer in the graduate. The hydrometer was removed and the graduated cylinder and contents shaken for two minutes, then set down. Forty seconds after the shaking period, hydrometer and temperature readings were made. Additional hydrometer and temperature readings were made at 10 and 90 minutes after the shaking period. Using the values measured, the percent aggregation was calculated. The soils used for the aggregation tests were reworked and rewatered five times after treatment. The soil was reworked to determine how resistant the aggregates formed were to physical breaking such as would be found when a field was cultivated.

TABLE A
*Types of soil treatment*

| Compounds | Percent Organic Additive |
|---|---|
| 1. Untreated soil | |
| 2. Carboxy-methyl cellulose—70 L.V. and 120 H.V. | 100 |
| 3. Carboxy-methyl cellulose—70 L.V. and 120 H.V.+Fe₂(SO₄)₃ | 5 to 50 |
| 4. Carboxy-methyl cellulose—70 L.V. and 120 H.V.+FeSO₄ | 25 to 50 |
| 5. Carboxy-methyl cellulose—70 L.V. and 120 H.V.+Al₂(SO₄)₃ | 5 to 10 |
| 6. Modified vinyl acetate maleic acid (Krilium) | 100 |
| 7. Modified vinyl acetate maleic acid+Fe₂(SO₄)₃ | 5 to 90 |
| 8. Modified vinyl acetate maleic acid+FeCl₃ | 10 |
| 9. Modified vinyl acetate maleic acid+Fe(NO₃)₃ | 10 |
| 10. Modified vinyl acetate maleic acid+Al₂(SO₄)₃ | 10 to 40 |
| 11. Modified vinyl acetate maleic acid+Al₂(SO₄)₃+Fe₂(SO₄)₃ | 10 to 20 |
| 12. Orzan+Fe₂(SO₄)₃ | 10 to 50 |
| 13. Carboxy-methylated pine sawdust | 100 |
| 14. Carboxy-methylated pine sawdust+Fe₂(SO₄)₃ | 10 |
| 15. Carboxy-methylated redwood sawdust | 100 |
| 16. Carboxy-methylated redwood sawdust+Fe₂(SO₄)₃ | 10 |
| 17. Palcotan+Fe₂(SO₄)₃ | 10 |
| 18. Sodium Palconate+Fe₂(SO₄)₃ | 10 to 25 |
| 19. Hydrolized polyacrylonitrile (Aerotil) | 100 |
| 20. Hydrolized polyacrylonitrile+Fe₂(SO₄)₃ | 5 to 90 |
| 21. Lignosite+Fe₂(SO₄)₃ | 10 |
| 22. Fe₂(SO₄)₃ | 0 |
| 23. FeCl₃ | 0 |
| 24. Fe(NO₃)₃ | 0 |
| 25. Al₂(SO₄)₃ | 0 |
| 26. Al₂(SO₄)₃+Fe₂(SO₄)₃ | 0 |
| 27. Flotal | |

TABLE I
*Cracking of soil surface*

| Treatment | Soils Used in Evaluation | | | | | | |
|---|---|---|---|---|---|---|---|
| | A | B | C | D | E | F | G |
| 1 | 2 | 5 | 2 | 5 | 3 | 3 | 5 |
| 2 | 2 | 5 | 2 | 3 | 1 | 2 | 4 |
| 3 | 1 | 2 | 1 | 2 | 1 | 1 | 1 |
| 4 | | 2 | | | | | |
| 5 | | 1 | | | | | |
| 6 | | 1 | 2 | 3 | 1 | 1 | |
| 7 | 1 | 1 | 1 | | | | 1 |
| 8 | 1 | | 1 | | | | 1 |
| 9 | 1 | | 1 | | | | 3 |
| 10 | 1 | | 1 | | | | 3 |
| 11 | 1 | | 1 | | | | 1 |
| 12 | | 4 | 1 | 3 | 3 | 2 | 4 |
| 13 | 1 | 5 | 2 | | | | 5 |
| 14 | 1 | 2 | 1 | | | | 4 |
| 15 | 2 | 5 | 2 | | | | 4 |
| 16 | 2 | 2 | 2 | | | | 4 |
| 17 | 2 | 2 | 1 | | | | 4 |
| 18 | 2 | 2 | 1 | | | | 4 |
| 19 | 1 | | 1 | | | | 2 |
| 20 | 1 | | 1 | | | | 2 |
| 21 | 1 | | 1 | | | | 4 |
| 22 | 3 | 2 | 3 | 2 | 2 | 2 | 5 |
| 23 | 1 | | 2 | | | | 4 |
| 24 | 1 | | 2 | | | | 3 |
| 25 | | 3 | | | | | |
| 26 | | 2 | | | | | |
| 27 | 3 | 4 | 3 | 3 | 2 | 3 | 4 |

TABLE II
*Hardness of soil surface*

| Treatment | Soils Used in Evaluation | | | | | | |
|---|---|---|---|---|---|---|---|
| | A | B | C | D | E | F | G |
| 1 | 4 | 5 | 4 | 5 | 3 | 3 | 4 |
| 2 | 4 | 5 | 5 | 4 | 1 | 1 | 3 |
| 3 | 2 | 1 | 1 | 1 | 1 | 1 | 2 |
| 4 | | 1 | | | | | |
| 5 | | 2 | | | | | |
| 6 | 4 | 1 | 1 | 1 | 1 | 1 | 3 |
| 7 | 3 | 1 | 1 | | | | 2 |
| 8 | 1 | | 1 | | | | 3 |
| 9 | 1 | | 1 | | | | 4 |
| 10 | 2 | | 1 | | | | 1 |
| 11 | 3 | | 2 | | | | 2 |
| 12 | 1 | 3 | 2 | 2 | 2 | 2 | 4 |
| 13 | 5 | 5 | 3 | | | | 5 |
| 14 | 2 | 3 | 1 | | | | 2 |
| 15 | 5 | 5 | 4 | | | | 5 |
| 16 | 3 | 3 | 1 | | | | 3 |
| 17 | 3 | 2 | 2 | | | | 4 |
| 18 | 3 | 3 | 2 | | | | 4 |
| 19 | 3 | | 3 | | | | 3 |
| 20 | 1 | | 2 | | | | 3 |
| 21 | 5 | | 2 | | | | 4 |
| 22 | 2 | 2 | 2 | 2 | 2 | 2 | 3 |
| 23 | 2 | | 2 | | | | 2 |
| 24 | 2 | | 2 | | | | 3 |
| 25 | | 3 | | | | | |
| 26 | | 3 | | | | | |
| 27 | 3 | 4 | 3 | 3 | 3 | 2 | 4 |

TABLE III
*Pounds pressure required to penetrate the soil to a three inch depth*

| Treatment | Soils Used in Evaluation | | | | | | |
|---|---|---|---|---|---|---|---|
| | A | B | C | D | E | F | G |
| 1 | 4.5 | 12.5 | 4.7 | 17.0 | 0.8 | 0.5 | 7.6 |
| 2 | 1.0 | 5.3 | 1.7 | 1.1 | 0.7 | 0.5 | 2.2 |
| 3 | 0.7 | 2.0 | 4.0 | 1.5 | 0.5 | 0.8 | 2.2 |
| 4 | | 2.0 | | | | | |
| 5 | | 1.5 | | | | | |
| 6 | 2.0 | 2.6 | 0.8 | 1.1 | 0.4 | 0.4 | 2.6 |
| 7 | 3.1 | 1.5 | 1.4 | | | | 0.5 |
| 8 | 0.8 | | 0.8 | | | | 1.5 |
| 9 | 0.5 | | 0.8 | | | | 1.5 |
| 10 | 0.5 | | 1.3 | | | | 1.7 |
| 11 | 0.8 | | 0.9 | | | | 1.4 |
| 12 | 0.7 | 4.0 | 1.3 | 2.5 | 0.9 | 0.5 | 3.3 |
| 13 | 6.6 | 15.0 | 1.7 | | | | 2.2 |
| 14 | 0.8 | 2.0 | 1.0 | | | | 2.2 |
| 15 | 8.0 | 18.2 | 2.1 | | | | 4.0 |
| 16 | 1.1 | 3.0 | 1.0 | | | | 2.2 |
| 17 | 1.8 | | 1.5 | | | | 2.0 |
| 18 | 1.0 | 2.7 | 1.0 | | | | 1.4 |
| 19 | 1.3 | | 2.6 | | | | 3.5 |
| 20 | 1.2 | | 1.0 | | | | 1.3 |
| 21 | 2.0 | | 1.0 | | | | 2.5 |
| 22 | 0.9 | 2.0 | 0.5 | 1.1 | 0.8 | 0.3 | 0.9 |
| 23 | 0.8 | | 0.8 | | | | 1.3 |
| 24 | 0.8 | | 1.0 | | | | 1.3 |
| 25 | | 5.1 | | | | | |
| 26 | | 2.8 | | | | | |
| 27 | 1.1 | 5.8 | 2.3 | 4.5 | 1.1 | 0.6 | 2.3 |

For the clod disintegration tests, clods that would not pass a ¼″ screen but no larger than 1″ in diameter were selected and placed in flower pots. The compounds were placed on top of the clods, the pots watered and dried. The pots were rewatered and dried twice, then screened on a ¼″ screen. The percent soil passing the screen is recorded in Table V.

In the accompanying tables, Table A lists the various treatments which were given to soil. It will be noted that in some instances the percentage of organic material is given as a range. In these cases, several tests were made through the range and substantially the same results obtained with various percentages of the additive. The trade name Orzan in the table indicates ammonium lignin sulfonates and sugars (a by-product of the paper industry). The name palconate indicates ground redwood bark from which the phenolic materials have been extracted. The name Lignosite indicates calcium lignin sulfonate. Palcotan is the sodium salt formed by reacting redwood bark with sodium sulfite. Sodium palconate is the sodium salt formed by reacting redwood bark with sodium hydroxide.

TABLE IV
*Percent aggregation*

| Treatment | Soils Used in Evaluation | | | | | | |
|---|---|---|---|---|---|---|---|
| | A | B | C | D | E | F | G |
| 1 | 90 | 82 | 83 | 80 | 93 | 89 | 81 |
| 2 | | | | 94 | 98 | 94 | |
| 3 | | 87 | | 85 | 95 | 92 | |
| 4 | | 85 | | | | | |
| 5 | | 86 | | | | | |
| 6 | | 94 | 97 | 95 | 97 | 96 | |
| 7 | 86 | 87 | 86 | | | | |
| 8 | | | | | | | 93 |
| 9 | | | | | | | |
| 10 | 86 | | 88 | | | | 89 |
| 11 | | | | | | | |
| 12 | | 88 | | 83 | 91 | 90 | |
| 13 | | 73 | | | | | |
| 14 | | 84 | | | | | |
| 15 | | 76 | | | | | |
| 16 | | 83 | | | | | |
| 17 | 84 | | | | | | |
| 18 | 84 | | | | | | |
| 19 | | | 85 | | | | |
| 20 | | | 81 | | | | |
| 21 | | | | | | | |
| 22 | 84 | 87 | 85 | 82 | 97 | 90 | 84 |
| 23 | | | | | | | |
| 24 | | | | | | | |
| 25 | | 87 | | | | | |
| 26 | | 82 | 83 | 84 | 93 | 90 | 81 |
| 27 | | | | | | | |

TABLE V
*Clod disintegration*

| Treatment | Soils Used in Evaluation | | | | | | |
|---|---|---|---|---|---|---|---|
| | A | B | C | D | E | F | G |
| 1 | 35.6 | 21.5 | 54.4 | 32.5 | 22.3 | 37.1 | 59.2 |
| 2 | | 24.7 | | 24.7 | 10.8 | 22.6 | |
| 3 | | 30.0 | | 38.3 | 38.3 | 30.6 | |
| 4 | | | | | | | |
| 5 | | | | | | | |
| 6 | 14.9 | 28.7 | 26.1 | 22.2 | 12.8 | 22.2 | 58.0 |
| 7 | 35.0 | | 36.8 | | | | 68.7 |
| 8 | | | | | | | |
| 9 | | | | | | | |
| 10 | 28.2 | | 38.5 | | | | 69.8 |
| 11 | | | | | | | |
| 12 | | 26.4 | | 26.2 | 17.5 | 24.3 | |
| 13 | | | | | | | |
| 14 | | | | | | | |
| 15 | | | | | | | |
| 16 | | | | | | | |
| 17 | | | | | | | |
| 18 | | | | | | | |
| 19 | 15.4 | | 24.4 | | | | 65.0 |
| 20 | 28.8 | | 42.5 | | | | 67.5 |
| 21 | | | | | | | |
| 22 | 33.9 | 36.4 | 42.2 | 37.8 | 34.3 | 35.1 | 71.0 |
| 23 | | | | | | | |
| 24 | | | | | | | |
| 25 | 31.1 | | 45.5 | | | | 74.3 |
| 26 | | | | | | | |
| 27 | 34.4 | 27.6 | 45.7 | 35.4 | 31.4 | 36.0 | 64.1 |

TABLE VI
*Units used in evaluation*

(1) Cracking of soil surface:
    (1) Very small cracks or no cracks.
    (2) Small cracks plus a few medium cracks.
    (3) Medium cracks.
    (4) Medium cracks plus a few wide, deep cracks.
    (5) Wide, deep cracks.
(2) Hardness of surface:
    (1) Very soft.
    (2) Soft.
    (3) Moderate.
    (4) Hard.
    (5) Very hard.
(3) Pounds' pressure required to penetrate a depth of 3 inches:
    0–1.0—Excellent.
    1.1–2.0—Good.
    2.1–3.0—Fair.
    3.1–4.0—Poor.
    Over 4.0—Very poor.

From the above, it is apparent that the soil improving agents of the present invention exert an effect far superior to that of the agents previously known and that the compounds of the present invention may be used in a wide range of concentrations to exert their beneficial effect.

In producing the soil improver of the present invention, no special procedures are necessary; the organic and inorganic substances are merely mixed together in the desired proportions, wet or dry.

The compositions of the present invention have also been found useful with water base drilling muds. The compositions may be added to the drilling muds in amounts of from 0.5% to 5% by weight and greatly improve the properties of the mud.

I claim:

1. The method of improving soil comprising adding to the soil a treating agent consisting essentially of from about 10 to about 95% by weight of a compound selected from the group consisting of the sulfate, nitrate and chloride salts of aluminum and iron, the balance of said composition being an organic soil stabilizing compound selected from the group consisting of a vinyl acetate-maleic acid copolymer having a molecular weight of at least 5,000; hydrolized polyacrylonitrile; carboxymethyl cellulose; lignin sulfonates; carboxymethylated pine sawdust; carboxymethylated redwood sawdust and ground redwood bark from which the phenolic materials have been extracted.

2. The method of claim 1 wherein the amount of the composition added to the soil is from 5 to 25 pounds per 100 square feet.

3. The method of improving soil comprising adding to the soil a composition consisting of from about 10 to about 95% of ferric sulfate, the balance of said composition being a vinyl acetate-maleic acid copolymer having a molecular weight of at least 5,000.

References Cited in the file of this patent

UNITED STATES PATENTS

| | | |
|---|---|---|
| 2,408,377 | Dangelmajer | Oct. 1, 1946 |
| 2,498,480 | Bierlich | Feb. 21, 1950 |
| 2,520,805 | Joy | Aug. 29, 1950 |
| 2,652,379 | Hedrick et al. | Sept. 15, 1953 |